(12) United States Patent
Takagi et al.

(10) Patent No.: US 9,166,418 B2
(45) Date of Patent: Oct. 20, 2015

(54) BATTERY SYSTEM AND CONTROL METHOD THEREOF

(75) Inventors: Masaru Takagi, Toyota (JP); Yuji Nishi, Nagoya (JP); Teruo Ishishita, Miyoshi (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 176 days.

(21) Appl. No.: 14/113,926

(22) PCT Filed: Apr. 13, 2012

(86) PCT No.: PCT/IB2012/000738
§ 371 (c)(1),
(2), (4) Date: Oct. 25, 2013

(87) PCT Pub. No.: WO2012/146962
PCT Pub. Date: Nov. 1, 2012

(65) Prior Publication Data
US 2014/0055094 A1    Feb. 27, 2014

(30) Foreign Application Priority Data
Apr. 28, 2011  (JP) ................................ 2011-102285

(51) Int. Cl.
*H02J 7/00*         (2006.01)
*B60L 11/18*       (2006.01)

(52) U.S. Cl.
CPC ........... *H02J 7/0021* (2013.01); *B60L 11/1803* (2013.01); *B60L 11/1816* (2013.01); *B60L 11/1862* (2013.01); *B60L 11/1866* (2013.01); *B60L 11/1879* (2013.01); *H02J 7/0054* (2013.01); *B60L 2240/547* (2013.01); *B60L 2240/549* (2013.01); *H02J 2007/0059* (2013.01); *Y02T 10/7005* (2013.01); *Y02T 10/7044* (2013.01); *Y02T 10/7061* (2013.01); *Y02T 90/14* (2013.01)

(58) Field of Classification Search
CPC .. H02J 7/0016; H02J 7/0018; Y02T 10/7055; Y02E 60/12; H01M 10/441
USPC ......................................................... 320/118
See application file for complete search history.

(56) References Cited

U.S. PATENT DOCUMENTS

| | | | |
|---|---|---|---|
| 5,717,310 A * | 2/1998 | Sakai et al. ................... | 307/10.1 |
| 6,191,558 B1 * | 2/2001 | Arai et al. ..................... | 320/132 |
| 7,049,792 B2 * | 5/2006 | King .............................. | 320/126 |
| 2005/0083014 A1 | 4/2005 | Baumgartner | |
| 2005/0135124 A1 * | 6/2005 | Diaz Guerra Mora et al. . | 363/49 |
| 2007/0241611 A1 * | 10/2007 | Shimada et al. .............. | 303/152 |

(Continued)

FOREIGN PATENT DOCUMENTS

| | | |
|---|---|---|
| EP | 1914139 A1 | 4/2008 |
| EP | 2469682 A1 | 6/2012 |
| JP | 11-332023 | 11/1999 |
| JP | 2008-041620 A | 2/2008 |
| JP | 2010115026 | 5/2010 |

(Continued)

*Primary Examiner* — Arun Williams
(74) *Attorney, Agent, or Firm* — Kenyon & Kenyon LLP

(57) ABSTRACT

The first battery is configured to be charged and discharged with a larger current than the second battery. The second battery has a higher storage capacity than the first battery. When the voltage of the second battery is lower than the voltage of the first battery, the controller allows charging of the second battery through the second relay while prohibiting charging of the first battery through the first relay until the voltage of the second battery reaches the voltage of the first battery.

16 Claims, 4 Drawing Sheets

(56) References Cited

U.S. PATENT DOCUMENTS

2010/0133913 A1* 6/2010 Iida .............................. 307/82
2012/0187919 A1* 7/2012 Andersson et al. .......... 320/138

FOREIGN PATENT DOCUMENTS

| JP | 2010246198 | 10/2010 |
| WO | 2011/021718 A1 | 2/2011 |

* cited by examiner

BATTERY SYSTEM AND CONTROL METHOD THEREOF

CROSS REFERENCE TO RELATED APPLICATION

This is a national phase application based on the PCT International Patent Application No. PCT/IB2012/000738 filed on Apr. 13, 2012, claiming priority to Japanese application No. 2011-102285 filed Apr. 28, 2011, the entire contents of both of which are incorporated herein by reference.

BACKGROUND OF THE INVENTION

1. Field of the Invention

The invention relates to a battery system having a high-power battery and a high-capacity battery electrically connected in parallel to each other, and a control method thereof.

2. Description of the Related Art

Japanese Patent Application Publication No. 11-332023 (JP 11-332023 A) and Japanese Patent Application Publication No. 2008-041620 (JP 2008-041620 A) describe a system in which a high-power battery and a high-capacity battery are electrically connected in parallel to each other. The high-power battery can be charged and discharged with a larger current than the high-capacity battery, while the high-capacity battery has a higher storage capacity than the high-power battery.

In such a system having a high-power battery and a high-capacity battery electrically connected to each other in parallel, current (circulating current) sometimes flows from the high-power battery to the high-capacity battery. In order to prevent this circulating current, it is conceivable to keep the voltage of the high-capacity battery at a higher level than the voltage of the high-power battery.

However, when the voltage of the high-capacity battery is kept at a higher level than the voltage of the high-power battery, the available range of state-of-charge (SOC) for control of charging and discharging of the high-capacity battery may be restricted. In other words, it may become difficult to efficiently use electrical energy stored in the high-capacity battery.

SUMMARY OF THE INVENTION

A first aspect of the invention provides a battery system including: a first battery; a second battery connected in parallel to the first battery; a first relay that switches between a state of allowing and a state of prohibiting charging and discharging of the first battery; a second relay that switches between a state of allowing and a state of prohibiting charging and discharging of the second battery; a controller for controlling the first relay and the second relay; and a voltage sensor that detects a voltage of each of the first and second batteries and outputs a detection result to the controller. The first battery is configured to be charged and discharged with a larger current than the second battery. The second battery has a higher storage capacity than the first battery. When a voltage of the second battery is lower than a voltage of the first battery, the controller allows the second battery to charge through the second relay while prohibiting the charge of the first battery through the first relay until the voltage of the second battery reaches the voltage of the first battery.

According to the first aspect of the invention, the first battery and the second battery are connected to each other in parallel in a state where the first battery and the second battery are at the same voltage. This makes it possible to suppress circulating current flowing between the first battery and the second battery. When a voltage of the second battery is lower than a voltage of the first battery, the available range of SOC of the second battery for control of charging and discharging thereof can be made wider than the available range of SOC of the first battery for control of charging and discharging thereof.

When the voltage of the second battery reaches the voltage of the first battery, the controller may allow the first battery to be charged through the first relay. This makes it possible to charge the first battery and the second battery while suppressing circulating current. When the SOC of the first battery reaches a reference value by the charging of the first battery, the controller may prohibit charging of the first battery through the first relay. In this case, the SOC of the first battery can be returned to the reference value when the SOC of the first battery is lower than the reference value. The reference value may be a value that is equal to or lower than a first upper limit that is the upper limit of the SOC of the first battery, and equal to or higher than a first lower limit that is the lower limit thereof. The reference value may be set as appropriate.

After prohibiting charging of the first battery, the controller may allow charging of the second battery until the SOC of the second battery reaches a second upper limit that is an upper limit of the SOC of the second battery. This makes it possible to discharge the second battery from the state in which the SOC of the second battery has reached the second upper limit, and hence to efficiently use the energy that can be stored in the second battery.

The second upper limit may be higher than the first upper limit, while a second lower limit of the SOC used for charge and discharge control of the second battery may be lower than the first lower limit. This means that, the range of the SOC used for control of charging and discharging of the second battery can be wider than the range of the SOC used for control of charging and discharging of the first battery.

The battery system may further comprise a booster circuit that boosts an output voltage of the first battery. Further, the battery system may further comprise a charging circuit that supplies electric power from an external power supply to the first battery and the second battery. Each of the first and second batteries may be a battery pack formed of a plurality of cells connected in series.

When a voltage of the second battery is higher than a voltage of the first battery, the controller may allow the second battery to discharge through the second relay until the voltage of the second battery reaches the voltage of the first battery, while prohibiting discharge of the first battery through the first relay. In this case, the first battery and the second battery are connected in parallel in a state in which the first and second batteries are at the same voltage. Therefore, circulating current flowing between the first battery and the second battery can be suppressed. When a voltage of the second battery is higher than a voltage of the first battery, the available range of SOC for control of charging and discharging of the second battery may be wider than the available range of SOC for control of charging and discharging of the first battery.

A second aspect of the invention relates to a battery system including: a first battery; a second battery connected in parallel to the first battery; a first relay that switches between a state of allowing and a state of prohibiting charging and discharging of the first battery; a second relay that switches between a state of allowing and a state of prohibiting charging and discharging of the second battery; a controller that controls the first relay and the second relay; and a voltage sensor that detects a voltage of each of the first and second batteries and outputs a detection result to the controller. The first battery is configured to be charged and discharged with a larger current than the second battery. The second battery has a higher storage capacity than the first battery. When a voltage of the second battery is higher than a voltage of the first battery, the controller allows discharging of the second battery through the second relay, while prohibiting charging and discharging of first battery through the first relay until the voltage of the second battery reaches the voltage of the first battery.

According to the second aspect of the invention, the first battery and the second battery are connected to each other in parallel in a state where the first battery and the second battery are at the same voltage. This makes it possible to suppress circulating current flowing between the first battery and the second battery. When a voltage of the second battery is higher than a voltage of the first battery, the available range of SOC of the second battery for control of charging and discharging thereof may be made wider than the available range of SOC of the first battery for control of charging and discharging thereof.

A third aspect of the invention relates to a control method for a battery system, including: when a voltage of a second battery is lower than a voltage of a first battery, allowing charging of the second battery until the voltage of the second battery reaches the voltage of the first battery; and when the voltage of the second battery is lower than the voltage of the first battery, prohibiting charging of the first battery until the voltage of the second battery reaches the voltage of the first battery. The first battery is configured to be charged and discharged with a larger current than the second battery; and the second battery has a higher storage capacity than the first battery. This third aspect of the invention also provides the same advantageous effects as those of the first aspect of the invention.

A fourth aspect of the invention relates to a control method for a battery system, including: when a voltage of a second battery is higher than a voltage of a first battery, allowing discharging of the second battery until the voltage of the second battery reaches the voltage of the first battery; and when the voltage of the second battery is higher than the voltage of the first battery, prohibiting discharging of the first battery until the voltage of the second battery reaches the voltage of the first battery. The first battery is configured to be charged and discharged with a larger current than the second battery; and the second battery has a higher storage capacity than the first battery. This fourth aspect of the invention also provides the same advantageous effects as those of the second aspect of the invention.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Exemplary embodiments of the invention will be described.

First Embodiment

Figure 1:
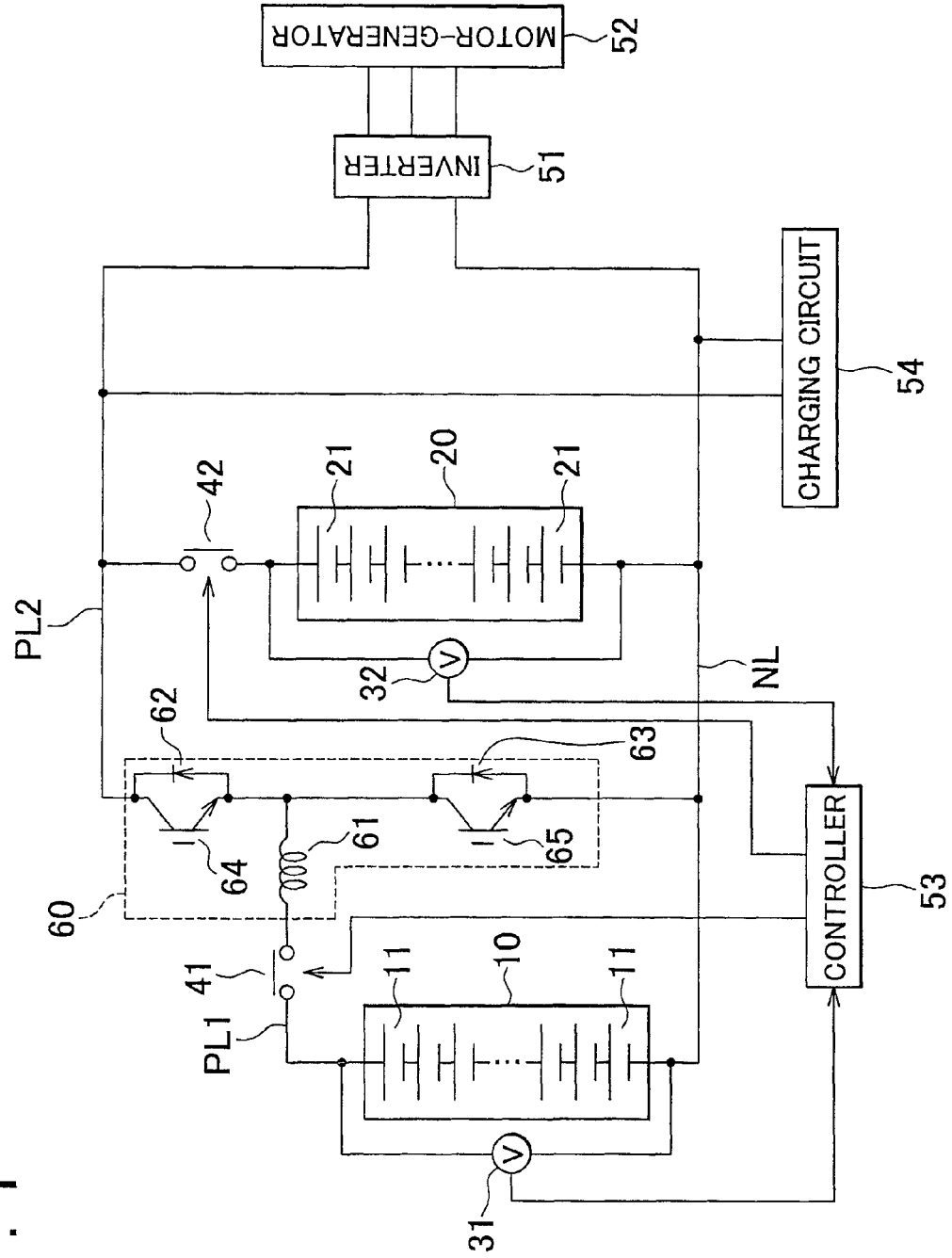
FIG. 1 is a circuit diagram illustrating a configuration of a battery system according to a first embodiment.

A battery system according a first embodiment of the invention will be described. FIG. 1 is a circuit diagram illustrating a configuration of the battery system of this embodiment. The battery system of this embodiment may be mounted on a vehicle.

The battery system according to the first embodiment includes a high-power battery pack (serving as a first battery) 10 and a high-capacity battery pack (serving as a second battery) 20. The high-power battery pack 10 and the high-capacity battery pack 20 are electrically connected in parallel to each other. The high-power battery pack 10 is a battery pack that is configured to charge and discharge with a larger current than the high-capacity battery pack 20. The high-capacity battery pack 20 is a battery pack having a higher storage capacity than the high-power battery pack 10.

The high-power battery pack 10 has a plurality of cells 11 electrically connected in series. The high-capacity battery pack 20 also has a plurality of cells 21 electrically connected in series. The cells 11 and 21 may be secondary batteries such as nickel-metal hydride batteries or lithium ion batteries. The number of the cells 11 forming the high-power battery pack 10 and the number of cells 21 forming the high-capacity battery pack 20 may be determined as appropriate. At least either the number of the cells 11 or the number of cells 21 may be one. At least one of the high-power battery pack 10 and the high-capacity battery pack 20 may include cells electrically connected in parallel.

When lithium ion batteries are used as the cells 11 and 21, hard carbon (non-graphitizable carbon material), for example, may be used as an anode active material for the cells 11. In this case, a lithium-manganese composite oxide may be used as a cathode active material for the cells 11. Graphite may be used as an anode active material for the cells 21. In this case, a lithium-manganese composite oxide may be used as a cathode active material for the cells 21.

The cell 11 of the high-power battery pack 10 and the cell 21 of the high-capacity battery pack 20 exhibit a relationship as shown in Table 1 below when mutually compared.

TABLE 1

| | Cell Characteristics | | Electrode Characteristics | |
| --- | --- | --- | --- | --- |
| | Output [W/kg] [W/L] | Capacity [Wh/kg] [Wh/L] | Output [mA/cm$^2$] | Capacity [mAh/g] [mAh/cc] |
| Cell 11 (high-power battery pack) | High | Low | High | Low |
| Cell 21 (high-capacity battery pack) | Low | High | Low | High |

In Table 1, the output of the cells 11 and 21 may be represented, for example, by electric power per unit mass of the cells 11 and 21 ([W/kg]), or by electric power per unit volume of the cells 11 and 21 ([W/L]). The output of the cell 11 is higher than the output of the cell 21. When it is assumed here that the cells 11 and 21 have the same mass or volume, the output [W] of the cell 11 is higher than the output [W] of the cell 21.

The capacity of the cells 11 and 21 may be represented, for example, by capacity per unit mass of the cells 11 and 21 ([Wh/kg]), or by capacity per unit volume of the cells 11 and 21 ([Wh/L]). The capacity of the cell 21 is higher than the capacity of the cell 11. When it is assumed here that the cells 11 and 21 have the same mass or volume, the capacity [Wh] of the cell 21 is higher than the capacity [Wh] of the cell 11.

In Table 1, output from the electrodes of the cells 11 and 21 may be represented, for example, by a current value per unit area of the electrodes ([$mA/cm^2$]). The output from the electrode of the cell 11 is higher than the output from the electrode of the cell 21. When it is assumed here that the electrodes have the same area, the value of the current flowing through the electrode of the cell 11 is greater than the value of the current flowing through the electrode of the cell 21.

Capacity of the electrodes of the cells 11 and 21 may be represented, for example, by capacity per unit mass of the electrodes ([mAh/g]) or by capacity per unit volume of the electrodes ([mAh/cc]). The capacity of the electrode of the cell 21 is higher than the capacity of the electrode of the cell 11. When it is assumed here that the electrodes have the same mass or volume, the capacity of the electrode of the cell 21 is higher than the capacity of the electrode of the cell 11.

A first voltage sensor 31 detects a terminal-to-terminal voltage (first total voltage V1) of the high-power battery pack 10 and outputs a detection result to a controller 53. A second voltage sensor 32 detects a terminal-to-terminal voltage (second total voltage V2) of the high-capacity battery pack 20 and outputs a detection result to the controller 53. (The first voltage sensor 31 and the second voltage sensor 32 serve as voltage sensors.)

A booster circuit 60 is arranged between the high-power battery pack 10 and the high-capacity battery pack 20. The booster circuit 60 boosts an output voltage of the high-power battery pack 10 and outputs the boosted voltage to the high-capacity battery pack 20. Also, the booster circuit 60 steps down a voltage output by the high-capacity battery pack 20 and outputs the stepped-down voltage to the high-power battery pack 10.

The booster circuit 60 includes a reactor 61, diodes 62 and 63, and transistors (npn transistors) 64 and 65 serving as switching elements. The reactor 61 is connected to a relay (serving as a first relay) 41 at one end, and to a connection point of the transistors 64 and 65 at the other end.

The transistors 64 and 65 are connected in series. A control signal from the controller 53 is input to the bases of the transistors 64 and 65. The diodes 62 and 63 are connected between the collectors and emitters of the transistors 64 and 65, respectively, so that current flows from the emitters to the collectors.

Insulated Gate Bipolar Transistors (IGBTs), for example, may be used as the transistor 64 and 65. Electric power switching elements such as Power Metal Oxide Semiconductor Field-Effect Transistors (MOSFETs) may be used instead of the npn transistors.

A smoothing capacitor (not shown) may be connected in parallel to the high-power battery pack 10 so as to smooth voltage variation between a positive line PL1 and a negative line NL of the high-power battery pack 10. Also, a smoothing capacitor (not shown) may be connected in parallel to the high-capacity battery pack 20 so as to smooth voltage variation between a positive line PL2 and the negative line NL of the high-capacity battery pack 20.

The booster circuit 60 boosts a direct current (DC) voltage supplied through the positive line PL1 of the high-power battery pack 10. The boosted voltage is output to the positive line PL2 of the high-capacity battery pack 20. Specifically, the controller 53 turns on the transistor 65, while turning off the transistor 64. This causes current to flow from the high-power battery pack 10 to the reactor 61, whereby magnetic field energy according to an amount of the current is accumulated in the reactor 61.

The controller 53 then switches the transistor 65 from ON state to OFF state, whereby current is caused to flow from the reactor 61 to the positive line PL2 of the high-capacity battery pack 20 via the diode 62. This causes the energy accumulated in the reactor 61 to be discharged to boost the voltage.

On the other hand, the booster circuit 60 steps down a DC voltage supplied from an inverter 51 (described later) to the voltage level of the high-power battery pack 10. Specifically, the controller 53 turns on the transistor 64 while turning off the transistor 65. This causes electric power from the inverter 51 to be supplied to the high-power battery pack 10 to charge the high-power battery pack 10.

The controller 53 switches the relay 41 from OFF state to ON state to connect the high-power battery pack 10 to the inverter 51. Output voltage of the high-power battery pack 10 is supplied to the inverter 51 after being boosted by the booster circuit 60. The controller 53 switches the relay (functioning as a second relay) 42 from OFF state to ON state to connect the high-capacity battery pack 20 to the inverter 51.

The inverter 51 converts DC electric power from the high-power battery pack 10 and the high-capacity battery pack 20 into alternating current (AC) electric power, and outputs the converted AC electric power to a motor-generator 52. A three-phase motor may be used as the motor-generator 52. The motor-generator 52 is supplied with the AC electric power from the inverter 51 and generates kinetic energy for driving a vehicle. The kinetic energy generated by the motor-generator 52 is transmitted to wheels.

When the vehicle is decelerated or halted, the motor-generator 52 may convert kinetic energy generated during braking of the vehicle into electric energy. The AC electric power generated by the motor-generator 52 is converted into DC electric power by the inverter 51 and then supplied to the high-power battery pack 10 and the high-capacity battery pack 20. In this manner, regenerative energy may be stored in the high-power battery pack 10 and the high-capacity battery pack 20.

In the battery system according to this embodiment, a charging circuit 54 is connected to the positive line PL2 and the negative line NL of the high-capacity battery pack 20. The charging circuit 54 is supplied with electric power from an external power supply to charge the high-power battery pack 10 and the high-capacity battery pack 20. A household power supply, for example, may be used as the external power supply. When using a household power supply, the charging circuit 54 converts AC electric power supplied from the household power supply into DC electric power and supplies the converted DC electric power to the high-power battery pack 10 and the high-capacity battery pack 20.

Figure 2:
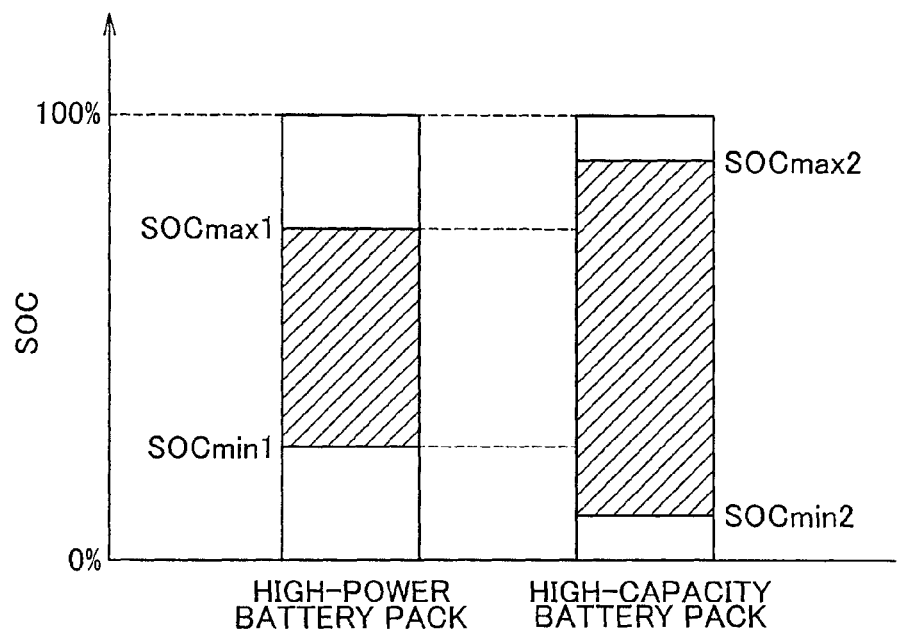
FIG. 2 is a diagram for explaining available ranges of SOC in a high-power battery pack and a high-capacity battery pack.

FIG. 2 is a diagram for explaining available ranges of State of Charge (SOC) in the high-power battery pack 10 and the high-capacity battery pack 20. In the high-power battery pack 10, the charge and discharge of the high-power battery pack 10 is controlled such that the SOC is contained within a range between a first lower limit SOCmin1 and a first upper limit SOCmax1. In the high-capacity battery pack 20, the charge and discharge of the high-capacity battery pack 20 is controlled such that the SOC is contained within a range between a second lower limit SOCmin2 and a second upper limit SOCmax2.

The second lower limit SOCmin2 is a lower value than the first lower limit SOCmin1. The second upper limit SOCmax2 is a higher value than the first upper limit SOCmax1. In the high-capacity battery pack 20, the available range of SOC that is used for the charge and discharge control is wider than that in the high-power battery pack 10. Therefore, the vehicle is enabled to travel longer distance by using output energy of the high-capacity battery pack 20 when the high-capacity battery pack 20 is discharged from the second upper limit SOCmax2 to the second lower limit SOCmin2.

Figure 3:
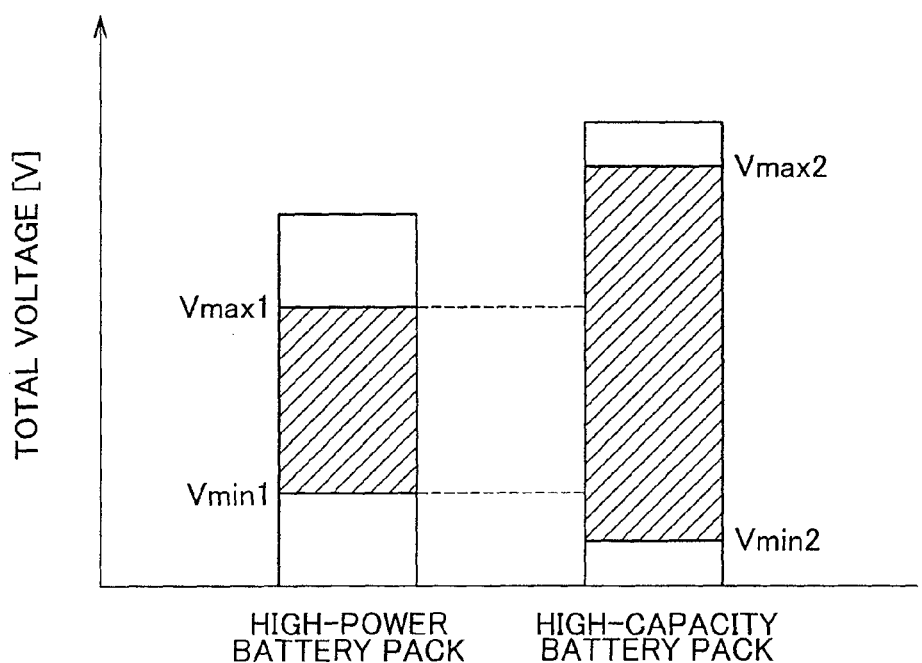
FIG. 3 is a diagram illustrating total voltage in a high-power battery pack and a high-capacity battery pack.

FIG. 3 is a diagram showing the total voltage in the high-power battery pack 10 and the high-capacity battery pack 20. The total voltage of the high-power battery pack 10 in its fully charged state is lower than the total voltage of the high-capacity battery pack 20 in its fully charged state.

As described with reference to FIG. 2, the charge and discharge of the high-power battery pack 10 is controlled within the range between the first lower limit SOCmin1 and the first upper limit SOCmax1. Therefore, a first total voltage V1 varies within a range between a lower limit voltage Vmin1 and an upper limit voltage Vmax1. The lower limit voltage Vmin1 corresponds to the first lower limit SOCmin1, and the upper limit voltage Vmax1 corresponds to the first upper limit SOCmax1.

The charge and discharge of the high-capacity battery pack 20 is controlled within the range between the second lower limit SOCmin2 and the second upper limit SOCmax2. Therefore, a second total voltage V2 varies within a range between a lower limit voltage Vmin2 and an upper limit voltage Vmax2. The lower limit voltage Vmin2 corresponds to the second lower limit SOCmin2, and the upper limit voltage Vmax2 corresponds to the second upper limit SOCmax2. As shown in FIG. 3, the lower limit voltage Vmin2 of the high-capacity battery pack 20 is lower than the lower limit voltage Vmin1 of the high-power battery pack 10. The upper limit voltage Vmax2 of the high-capacity battery pack 20 is higher than the upper limit voltage Vmax1 of the high-power battery pack 10.

In the battery system according to the first embodiment, the high-capacity battery pack 20 may be discharged from the second upper limit SOCmax2 to the second lower limit SOCmin2, so that the vehicle is driven with use of this discharge energy. When high current is required in response to an accelerator operation by the driver, the output of the high-power battery pack 10 may be used in addition to the output of the high-capacity battery pack 20.

After the high-capacity battery pack 20 has been discharged to the second lower limit SOCmin2, the vehicle may be driven with use of the output of the high-power battery pack 10. In this case, the travel distance of the vehicle is increased by using the output energy of the high-capacity battery pack 20 and the output energy of the high-power battery pack 10. If the vehicle according to the embodiment is provided with an internal combustion engine or a fuel battery, energy generated by the internal combustion engine or fuel battery may be used together with the energy output from the high-power battery pack 10 to drive the vehicle.

When the high-capacity battery pack 20 has been discharged until the second total voltage V2 reaches the lower limit voltage Vmin2, the high-capacity battery pack 20 needs to be charged. Specifically, the high-capacity battery pack 20 needs to be charged with use of the charging circuit 54 before the high-power battery pack 10 and the high-capacity battery pack 20 are connected in parallel.

Although, in this embodiment, charging current from the charging circuit 54 is supplied to the high-power battery pack 10 and the high-capacity battery pack 20, the aspects of the invention are not limited to this, and an another system capable of supplying electric power to the high-power battery pack 10 and the high-capacity battery pack 20 may be used instead. For example, kinetic energy generated by the internal combustion engine may be converted into electric energy, and this electric energy may be used to charge the high-power battery pack 10 and the high-capacity battery pack 20. Further, electric energy generated by the fuel battery may be used to charge the high-power battery pack 10 and the high-capacity battery pack 20.

Figure 4:
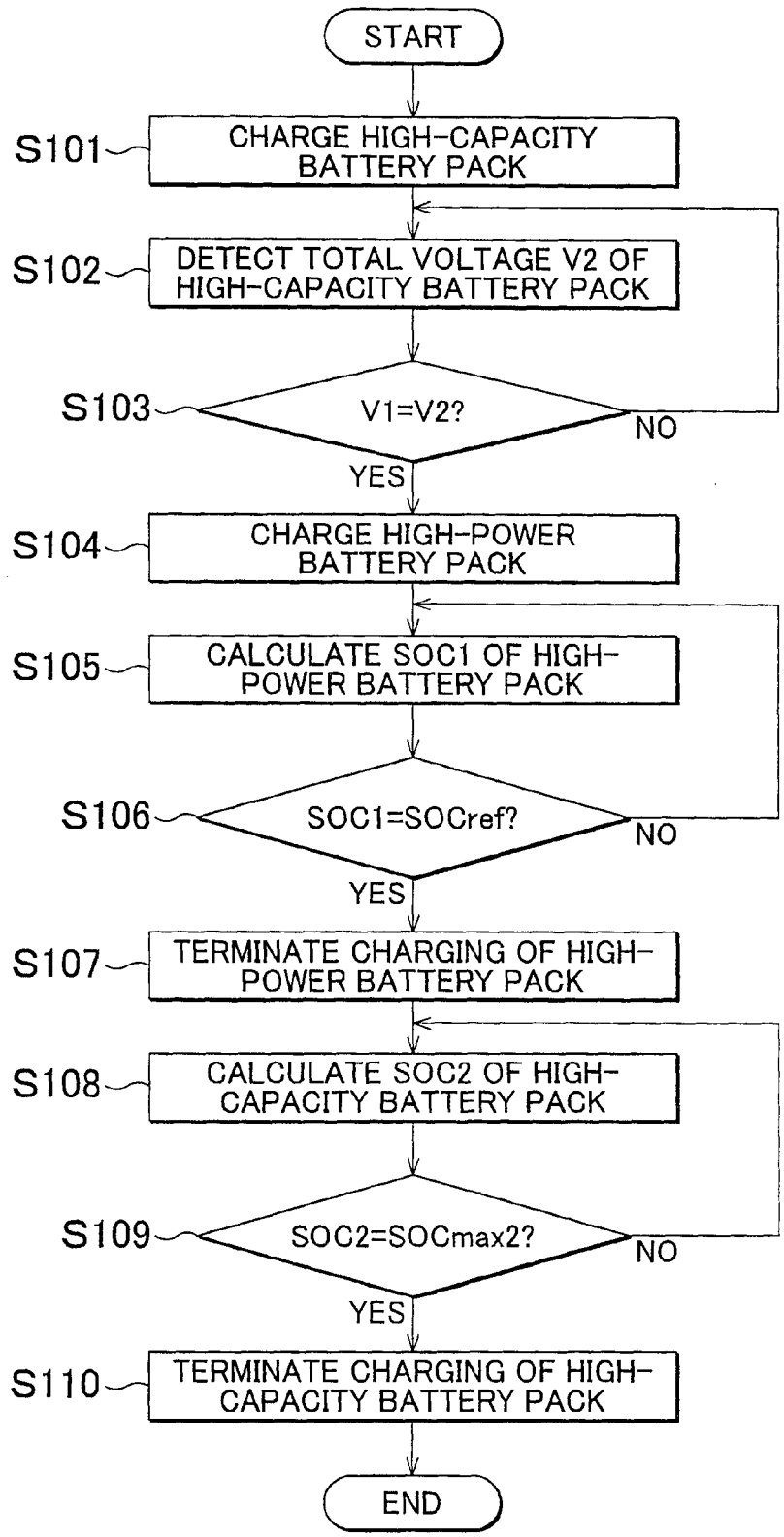
FIG. 4 is a flowchart illustrating charge control in the battery system according to the first embodiment.

FIG. 4 is a flowchart for illustrating processing for charging the high-capacity battery pack 20. The processing shown in FIG. 4 is performed by the controller 53. A computer program for causing the controller 53 (CPU) to perform the processing shown in FIG. 4 may be preliminarily stored in a memory (not shown).

In step S101, the controller 53 starts charging of the high-capacity battery pack 20. Specifically, the controller 53 switches the relay 42 from OFF state ON state so that charging current from the charging circuit 54 is supplied to the high-capacity battery pack 20. The controller 53 keeps the relay 41 in its OFF state during this process.

In step S102, the controller 53 detects a second total voltage V2 based on an output of the second voltage sensor 32. In step S103, the controller 53 determines whether or not the second total voltage V2 detected in step S102 has reached the first total voltage V1.

The first total voltage V1 may be specified based on an output of the first voltage sensor 31 when the relay 41 is switched from ON state to OFF state. This means that when the relay 41 is switched from ON state to OFF state, the controller 53 may store the first total voltage V1 obtained based on the output of the first voltage sensor 31 in a memory.

Figure 5:
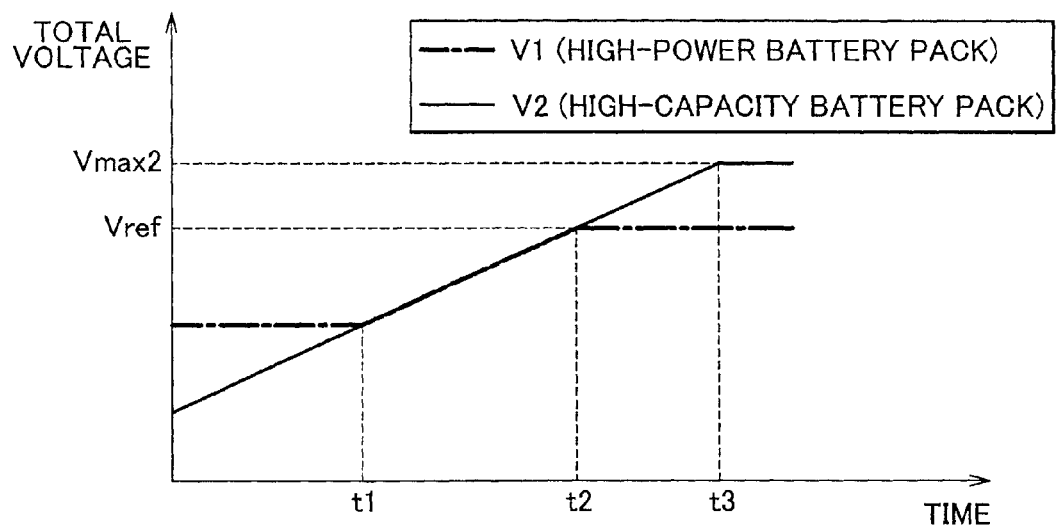
FIG. 5 is a diagram illustrating variation in total voltage in the high-power battery pack and the high-capacity battery pack.

When the second total voltage V2 detected in step S102 has not reached the first total voltage V1, the controller returns to the processing of step S102. When the second total voltage V2 has reached the first total voltage V1, the controller proceeds to processing of step S104. As shown in FIG. 5, the second total voltage V2 continues to rise until time t1 elapses from when charging of the high-capacity battery pack 20 is started. On the other hand, the first total voltage V1 does not vary. This means that the first total voltage V1 is maintained at a voltage when the charging and discharging of the high-power battery pack 10 is prohibited.

In step S104, the controller 53 starts to charge the high-power battery pack 10. Specifically, the controller 53 switches the transistor 64 from OFF state to ON state while switching the relay 41 from OFF state to ON state. The transistor 65 is kept in its OFF state during this process. As a result of this, the charging current from the charging circuit 54 is supplied also to the high-power battery pack 10. A voltage from the charging circuit 54 is stepped down by the booster circuit 60 and then supplied to the high-power battery pack 10.

In step S105, the controller 53 calculates a SOC1 of the high-power battery pack 10. A conventional appropriate method may be used as the method of calculating the SOC1.

For example, the SOC1 of the high-power battery pack 10 may be calculated by integrating the charge and discharge current of the high-power battery pack 10. In this case, a current sensor is required for detecting charge and discharge current of the high-power battery pack 10. Alternatively, the SOC1 of the high-power battery pack 10 may be specified by measuring an open circuit voltage (OCV) of the high-power battery pack 10. Since OCV and SOC1 are in correspondence relationship, the SOC1 may be specified based on the OCV by using a map showing the correspondence relationship preliminarily obtained.

In step S106, the controller 53 determines whether or not the SOC1 calculated in step S105 has reached a reference value SOCref. The reference value SOCref is a value that is equal to or lower than the first upper limit SOCmax1 and is equal to or higher than the first lower limit SOCmin1, and may be set as appropriate. When the SOC1 has not reached the reference value SOCref, the controller returns to step S105 to continue charging of the high-power battery pack 10 and the high-capacity battery pack 20. When the SOC1 has reached the reference value SOCref, the controller proceeds to processing of step S107.

In step S107, the controller 53 stops charging of the high-power battery pack 10. Specifically, the controller 53 switches the relay 41 from ON state to OFF state, while switching the transistor 64 from ON state to OFF state. In this case, only the charging of the high-capacity battery pack 20 is continued.

As shown in FIG. 5, the second total voltage V2 and the first total voltage V1 rise during the period from the time t1 to time t2. When the first total voltage V1 reaches a voltage Vref at the time t2, the charging of the high-power battery pack 10 is stopped, and the first total voltage V1 is kept at the voltage Vref. The voltage Vref is a value corresponding to the reference value SOCref.

In step S108, the controller 53 calculates a SOC2 of the high-capacity battery pack 20. The SOC2 may be calculated in the same manner as the SOC1 of the high-power battery pack 10.

In step S109, the controller 53 determines whether or not the SOC2 calculated in step S108 has reached the second upper limit SOCmax2. When the SOC2 has not reached the second upper limit SOCmax2, the controller returns to step S108 and continues charging of the high-capacity battery pack 20. When the SOC2 has reached the second upper limit SOCmax2, the controller proceeds to processing of step S110.

In step S110, the controller 53 stops charging of the high-capacity battery pack 20. Specifically, the controller 53 switches the relay 42 from ON state to OFF state.

As shown in FIG. 5, only the second total voltage V2 rises during the period from time t2 to time t3. The first total voltage V1 is maintained at the voltage Vref. When the second total voltage V2 reaches the upper-limit voltage Vmax2 at the time t3, the charging of the high-capacity battery pack 20 is stopped, and the second total voltage V2 is maintained at the upper-limit voltage Vmax2.

According to the control shown in FIG. 4, charging of the high-capacity battery pack 20 is started when the relay 41 is in OFF state, in other words, in a state of prohibiting charging and discharging of the high-power battery pack 10. If the relay 41 is switched to ON state, circulating current will flow from the high-power battery pack 10 to the high-capacity battery pack 20. Since a current value during charging and discharging of the high-power battery pack 10 is higher than a current value during charging and discharging of the high-capacity battery pack 20, the current value of the current flowing from the high-power battery pack 10 to the high-capacity battery pack 20 may possibly exceed the allowable current value for the high-capacity battery pack 20.

Therefore, according to this embodiment, the relay 41 is kept in its OFF state when the high-capacity battery pack 20 is charged in a state in which the second total voltage V2 is lower than the first total voltage V1, whereby the flow of electric current from the high-power battery pack 10 to the high-capacity battery pack 20 can be suppressed.

If the lower-limit voltage Vmin2 of the high-capacity battery pack 20 is maintained higher than the total voltage V1 of the high-power battery pack 10, the flow of electric current from the high-power battery pack 10 to the high-capacity battery pack 20 may be prevented. In this case, however, the SOC available range of the high-capacity battery pack 20 is restricted, and hence the high-capacity battery pack 20 cannot be used efficiently.

On the other hand, according this embodiment, after the second total voltage V2 has reached the first total voltage V1, the SOC1 of the high-power battery pack 10 may be brought closer to the reference value SOCref by charging the high-capacity battery pack 20 and the high-power battery pack 10. After the SOC1 of the high-power battery pack 10 has reached the reference value SOCref, the SOC2 of the high-capacity battery pack 20 may be raised to the second upper limit SOCmax2 by charging only the high-capacity battery pack 20.

According to this embodiment, as described above, after the high-capacity battery pack 20 has been discharged until the SOC2 of the high-capacity battery pack 20 reaches the first lower limit SOCmin2, the high-capacity battery pack 20 may be charged until the SOC2 reaches the second upper limit SOCmax2. In this manner, the high-capacity battery pack 20 can be used within the range between the second upper limit SOCmax2 and the second lower limit SOCmin2.

Although the booster circuit 60 is provided in the embodiment, the booster circuit 60 may be omitted. This means that the high-power battery pack 10 and the high-capacity battery pack 20 may be electrically connected to each other in parallel without the booster circuit 60 interposed therebetween.

Although the embodiment has been described in terms of a case in which the high-power battery pack 10 and the high-capacity battery pack 20 are charged, the embodiment is not limited to this. Specifically, when the high-power battery pack 10 and the high-capacity battery pack 20 are to be discharged, a control as described below may be performed.

When the charging control as described with reference to FIG. 4 is performed, the SOC1 of the high-power battery pack 10 becomes equal to the reference value SOCref and the SOC2 of the high-capacity battery pack 20 becomes equal to the second upper limit SOCmax2. The controller 53 may then switch the relay 42 to ON state to discharge the high-capacity battery pack 20. Thus, kinetic energy may be generated to drive the vehicle by using electric power output by the high-capacity battery pack 20. In this case, the controller 53 switches the relay 41 to OFF state to prohibit discharging of the high-power battery pack 10.

When only the high-capacity battery pack 20 is discharged, only the second total voltage V2 will drop down. When the second total voltage V2 reaches the first total voltage V1, the controller 53 may switch the relay 41 from OFF state to ON state so that the high-power battery pack 10 is also discharged.

When the high-power battery pack 10 and the high-capacity battery pack 20 are electrically connected in parallel, the second total voltage V2 is equal to the first total voltage V1. This prevents the circulating current from flowing between the high-power battery pack 10 and the high-capacity battery pack 20.

When the parallel-connected high-power battery pack 10 and high-capacity battery pack 20 are discharged, the SOC1 of the high-power battery pack 10 becomes lower than the reference value SOCref, while the SOC2 of the high-capacity battery pack 20 also drops down. The controller 53 prohibits discharging of the high-power battery pack 10 by switching the relay 41 from ON state to OFF state before the SOC1 of the high-power battery pack 10 reaches the first lower limit SOCmin1. Alternatively, the controller 53 may switch the relay 41 from ON state to OFF state at the same time as the SOC1 reaches the first lower limit SOCmin1.

On the other hand, the controller 53 keeps the relay 42 in its ON state to continue discharging of the high-capacity battery pack 20. The controller 53 may discharge the high-capacity battery pack 20 until the SOC2 of the high-capacity battery pack 20 reaches the second lower limit SOCmin2. Once the SOC2 of the high-capacity battery pack 20 reaches the second lower limit SOCmin2, the controller 53 prohibits discharging of the high-capacity battery pack 20 by switching the relay 42 from ON state to OFF state.

After the discharging of the high-power battery pack 10 and the high-capacity battery pack 20 is stopped, the high-power battery pack 10 and the high-capacity battery pack 20 may be charged as described with reference to FIG. 4. Although the booster circuit 60 is provided in this modification as well, the booster circuit 60 may be omitted and the high-power battery pack 10 and the high-capacity battery pack 20 may be connected in parallel to each other.

The invention claimed is:

1. A battery system comprising:
a first battery;
a second battery connected in parallel to the first battery;
a first relay that switches between a state of allowing and a state of prohibiting charging and discharging of the first battery;
a second relay that switches between a state of allowing and a state of prohibiting charging and discharging of the second battery;
a controller that controls the first relay and the second relay; and
a voltage sensor that detects a voltage of each of the first and second batteries and outputs a detection result to the controller, wherein:
the first battery is configured to be charged and discharged with a larger current than the second battery;
the second battery has a higher storage capacity than the first battery;
when the voltage of the second battery is lower than the voltage of the first battery, the controller allows charging of the second battery through the second relay while prohibiting charging of the first battery through the first relay until the voltage of the second battery reaches the voltage of the first battery; and
the controller allows, when the voltage of the second battery reaches the voltage of the first battery, charging of the first battery through the first relay and charging of the second battery through the second relay.

2. The battery system according to claim 1, wherein the controller prohibits charging of the first battery through the first relay when a state-of-charge of the first battery reaches a reference value by the charging of the first battery.

3. The battery system according to claim 2, wherein the reference value is a value that is equal to or lower than a first upper limit of the state-of-charge of the first battery and equal to or higher than a first lower limit of the state-of-charge of the first battery.

4. The battery system according to claim 3, wherein after prohibiting charging of the first battery, the controller allows charging of the second battery until a state-of-charge of the second battery reaches a second upper limit that is an upper limit of the state-of-charge of the second battery.

5. The battery system according to claim 4, wherein the second upper limit is higher than the first upper limit, and a second lower limit that is a lower limit of the state-of-charge of the second battery is lower than the first lower limit.

6. The battery system according to claim 1, further comprising a booster circuit that boosts an output voltage of the first battery.

7. The battery system according to claim 1, further comprising a charging circuit that supplies electric power from an external power supply to the first battery and the second battery.

8. The battery system according to claim 1, wherein each of the first battery and the second battery is a battery pack in which a plurality of cells are connected in series.

9. The battery system according to claim 1, wherein when the voltage of the second battery is higher than the voltage of the first battery, the controller allows discharging of the second battery through the second relay while prohibiting the discharging of the first battery through the first relay until the voltage of the second battery reaches the voltage of the first battery.

10. A control method for a battery system, the control method comprising:
when a voltage of a second battery is lower than a voltage of a first battery, allowing charging of the second battery until the voltage of the second battery reaches the voltage of the first battery;
when the voltage of the second battery is lower than the voltage of the first battery, prohibiting charging of the first battery until the voltage of the second battery reaches the voltage of the first battery; and
when the voltage of the second battery reaches the voltage of the first battery, allowing charging of the first battery and the second battery, wherein:
the first battery is configured to be charged and discharged with a larger current than the second battery; and
the second battery has a higher storage capacity than the first battery.

11. The control method for a battery system according to claim 10, further comprising: prohibiting charging of the first battery when a state-of-charge of the first battery reaches a reference value by the charging of the first battery.

12. The control method for a battery system according to claim 11, wherein the reference value is a value that is equal to or lower than a first upper limit of the state-of-charge of the first battery and equal to or higher than a first lower limit of the state-of-charge of the first battery.

13. The control method for a battery system according to claim 12, further comprising: allowing charging of the second battery until a state-of-charge of the second battery reaches a second upper limit that is an upper limit of the state-of-charge of the second battery after prohibiting charging of the first battery.

14. The control method for a battery system according to claim 13, wherein the second upper limit is higher than the first upper limit, and a second lower limit that is a lower limit of the state-of-charge of the second battery is lower than the first lower limit.

15. The control method for a battery system according to claim 10, wherein the first battery and the second battery are charged by being supplied with electric power from an external power supply.

16. The control method for a battery system according to claim 10, further comprising: when the voltage of the second battery is higher than the voltage of the first battery, allowing discharging of the second battery while prohibiting discharging of the first battery until the voltage of the second battery reaches the voltage of the first battery.

\* \* \* \* \*